United States Patent
Matsuura

(10) Patent No.: US 7,518,821 B2
(45) Date of Patent: Apr. 14, 2009

(54) HARD DISK DRIVE

(75) Inventor: Michio Matsuura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/060,631

(22) Filed: Apr. 1, 2008

(65) Prior Publication Data

US 2008/0186616 A1 Aug. 7, 2008

Related U.S. Application Data

(63) Continuation of application No. PCT/JP2005/019288, filed on Oct. 20, 2005.

(51) Int. Cl.
*G11B 5/596* (2006.01)
*G11B 21/02* (2006.01)

(52) U.S. Cl. .............. 360/78.13; 360/78.04; 360/77.04; 360/75

(58) Field of Classification Search ............... None
See application file for complete search history.

(56) References Cited

U.S. PATENT DOCUMENTS

| | | | |
|---|---|---|---|
| 7,113,691 B1 | 9/2006 | Brandsma | |
| 7,218,471 B2* | 5/2007 | Meyer | 360/75 |
| 7,263,281 B2 | 8/2007 | Kanda et al. | |
| 2004/0100712 A1* | 5/2004 | Drouin | 360/55 |
| 2006/0209455 A1* | 9/2006 | Ehrlich | 360/77.08 |

FOREIGN PATENT DOCUMENTS

| | | |
|---|---|---|
| JP | A 2-23572 | 1/1990 |
| JP | A 10-149644 | 6/1998 |
| JP | A 2001-118203 | 4/2001 |
| JP | A 2003-85891 | 3/2003 |
| JP | A 2003-132621 | 5/2003 |
| JP | A 2003-263850 | 9/2003 |
| WO | WO 01/31650 A1 | 5/2001 |

* cited by examiner

*Primary Examiner*—Andrew L Sniezek
(74) *Attorney, Agent, or Firm*—Greer, Burns & Crain, Ltd.

(57) ABSTRACT

Stable recording and reproduction of data onto and from a recording medium that requires precise tracking is provided by using a simple head tracking mechanism. In a hard disk drive (200), a piece of sector data to be written or read is pre-associated with a sector number of a sector where the piece of sector data is to be written or read. A seek control unit (260) corrects first-order run-out relative to a revolution axis of a DTM magnetic disk (100) and permits second-and-higher order run-out relative to the revolution axis, and moves a read/write head (122, 124) gradually in one radial direction of the DTM magnetic disk at a shift pitch smaller than the track pitch for each revolution in accordance with the sector numbers of the sectors where pieces of sector data are to be written or read, within a range of tracks containing the sector numbers of the sectors where the pieces of sector data are to be written or read. A recording/reproducing unit (266, 268) writes or reads, in accordance with a present sector number of a sector where the write/read head is located, a corresponding piece of sector data onto or from the DTM magnetic disk, independently of the order of the sector numbers.

17 Claims, 7 Drawing Sheets

HARD DISK DRIVE

This application is a continuation of PCT International Application No. PCT/JP2005/19288, filed Oct. 20, 2005.

FIELD OF THE INVENTION

The present invention generally relates to write and read of sector data onto and from a recording medium of a hard disk drive and, in particular, to non-sequential write and read of sector data onto and from a discrete track medium (DTM) magnetic disk.

BACKGROUND OF THE INVENTION

Typically, a hard disk drive is produced, by assembling a magnetic disk or platter revolved by a spindle motor, and a swing arm coupled to an actuator and having a magnetic head into a single assembly. Then, the magnetic disk is formatted by writing servo data containing sector numbers onto it. However, the recent increase in the storage capacity in magnetic disks has caused a significant increase in the time required for writing the servo data. In order to address this time increase, alternative techniques are recently used for writing servo data onto each magnetic disk by a single-disk STW (Servo Track Writer) or for magnetically duplicating servo data onto each magnetic disk by placing a patterned magnetic master in contact with each magnetic disk, before a plurality of such magnetic disks with the servo data written on them are assembled into the single assembly.

These techniques may involve small first-order disk runout or misalignment of a center axis of the magnetic disk relative to a revolution axis for it, a difference in run-out of a spindle, and shape distortions related to a patterned magnetic master work inaccuracy and a duplication process. However, servo control in a hard disk drive can be provided so as to trace tracks in the form of virtually perfect circles without being affected by such shape distortions, by correcting an amount of the first-order run-out by means of feed-forward control a position of the magnetic head of the hard disk drive, because a disk surface on a data recording area of the magnetic disk is flat.

In recent years, an improved recording medium or a DTM (discrete track medium) magnetic disk for a magnetic disk has been developed, such that adjacent recording tracks on the magnetic disk are magnetically separated to thereby suppress mutual magnetic interference (i.e., cross-erase or cross-talk) between the adjacent tracks and suppress broadening of the recording magnetic domain, and such that spaces between the adjacent tracks are narrowed to thereby increase a storage capacity of the magnetic disk. In the DTM magnetic disk, grooves are formed on the magnetic disk between tracks to be traced by a magnetic head, by a physical machining process such as etching.

PCT International Publication WO 01/031650-A1 published on May 3, 2001 describes a method and an apparatus for writing data onto a recording medium, such as an optical disk and a magnetic disk, and reading data from the recording medium. According to this method, when a block of the medium is defective, the data to be written in this block is stored in an auxiliary memory. Subsequently, all the data from the auxiliary memory is copied to a predetermined spare area of the medium. Conversely, when the medium is read, data is first copied from the spare area of the medium to the auxiliary memory. If a block then appears to be defective, the correct information is read from the auxiliary memory. Thus, it is possible to write and read a real-time audio and/or video signal in a reliable manner without the possible presence of any defective blocks affecting the data transfer rate.

Japanese Patent Application Publication JP 2003-85891-A published on Mar. 20, 2003 describes a non-tracking recording/reproducing system. In this system, information is recorded on a track on a removable disk made of synthetic resins as base materials, according to a packet recording scheme. Thus, a packet is used as a unit to form a track. In this removable disk, recording and reproducing are performed according to a non-tracking scheme. Thus, the track pitch is reduced to be 20 μm or smaller, and the track density is increased so that the capacity of the disk is increased.

DISCLOSURE OF THE INVENTION

An object of the present invention is to provide stable recording and reproduction of data onto and from a recording medium that requires precise tracking, by using a simple head tracking mechanism.

Another object of the invention is to allow stable recording and reproduction of data onto and from a recording medium even under an environment where dynamic disturbance may continuously act on a write/read head for the recording medium.

SUMMARY OF THE INVENTION

In accordance with an aspect of the present invention, a hard disk drive includes: a discrete track medium (DTM) magnetic disk which has a plurality of tracks, each track being divided into a plurality of sectors; a write/read head which writes sector data onto one side of the DTM magnetic disk, and which reads sector data from the one side of the DTM magnetic disk; a sector data buffer memory unit; a recording/reproducing unit which provides sector data from the sector data buffer memory unit, to the write/read head, and which provides sector data from the write/read head, to the sector data buffer memory unit; and a seek control unit which controls the write/read head in terms of position, in accordance with a sector number of a sector where a piece of sector data is to be written or read and with a sector number of a sector where the write/read head is located. The piece of sector data to be written or read is pre-associated with the sector number of the sector where the piece of sector data is to be written or read. The seek control unit corrects first-order run-out relative to a revolution axis of the DTM magnetic disk and permits second-and-higher order run-out relative to the revolution axis of the DTM magnetic disk, and moves the write/read head gradually in a radial direction of the DTM magnetic disk at a shift pitch smaller than the track pitch for each revolution in accordance with sector numbers of sectors where pieces of sector data are to be written or read, within a range of tracks containing the sector numbers of the sectors where the pieces of sector data are to be written or read. The recording/reproducing unit writes or reads, in accordance with a present sector number of a sector where the write/read head is located, a corresponding piece of sector data onto or from the DTM magnetic disk, independently of the order of the sector numbers.

The invention also relates to an information processing device having such a hard disk drive as described above.

According to the invention, data can be stably recorded and reproduced onto and from a recording medium that requires precise tracking by using a simple head tracking mechanism, and data can be stably recorded and reproduced onto and from a recording medium even under an environment where dynamic disturbance may continuously act on a write/read head.

DESCRIPTION OF THE PREFERRED EMBODIMENTS

Figure 1:
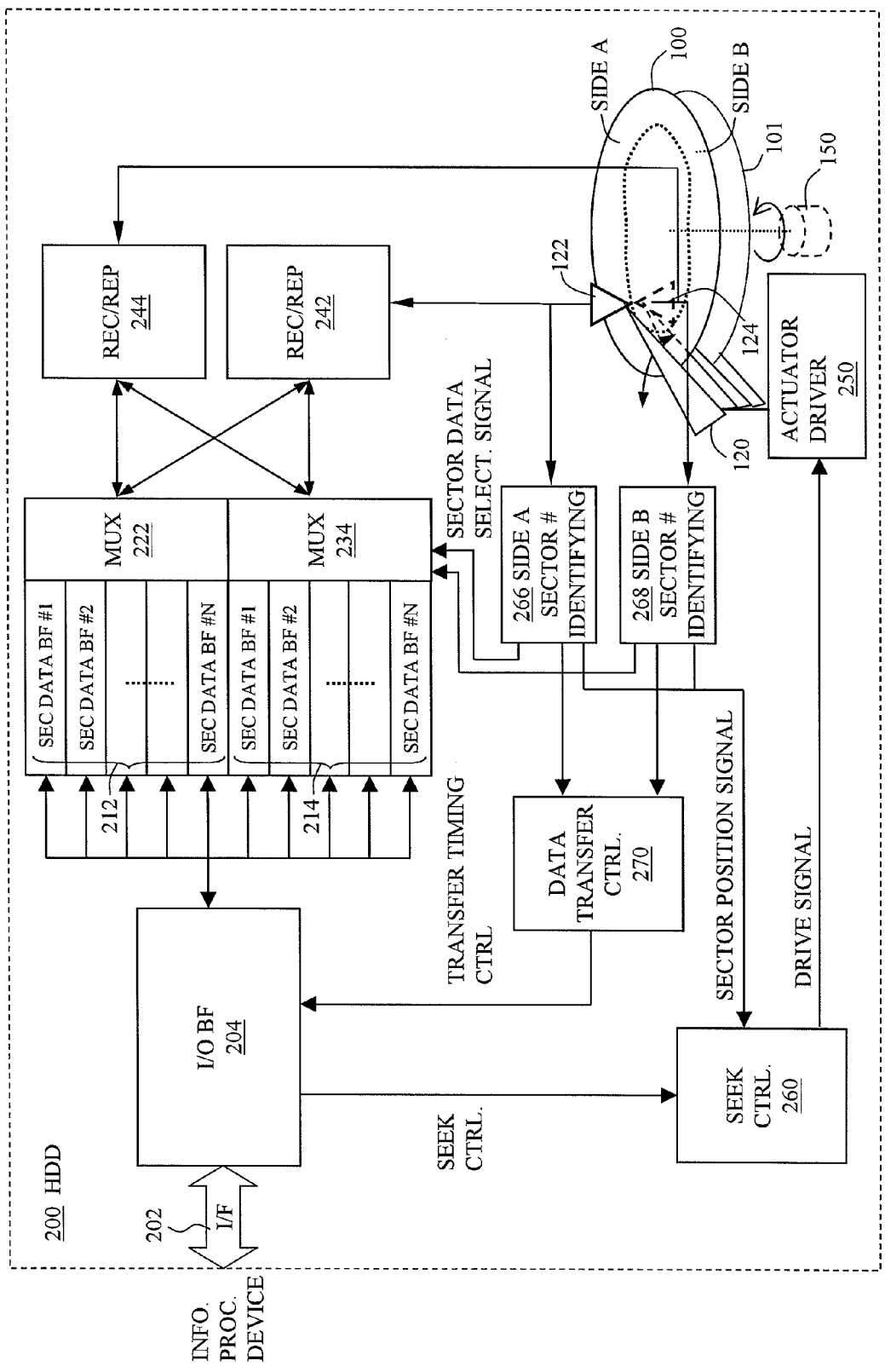
FIG. 1 shows a hard disk drive (HDD), which includes a DTM magnetic disk and a write and read control device for the magnetic disk, in accordance with an embodiment of the present invention.

When a DTM magnetic disk is incorporated into a hard disk drive, first-order run-out of the DTM magnetic disk occurs due to misalignment of its center hole position, similarly to that of a common hard disk drive. The magnetic head is required to trace accurately a track on the DTM magnetic disk that has second-and-higher order shape distortions as well as the above-mentioned run-out, in order to sufficiently take advantage of the DTM feature. Thus, in a hard disk drive employing a DTM magnetic disk, positioning control for the magnetic head becomes more complicated, and hence causes an increase in the manufacturing cost and the power consumption in the hard disk drive. For example, high-speed and precise control is required for tracing the finer, second-and-higher order run-out other than the first-order run-out, and hence causes an increase in the power consumption. In particular, in a small hard disk drive, a high power is required for tracing the second-and-higher order run-out. This causes a difficulty in simultaneously achieving large capacity storage and low power consumption in a portable device having such a small hard disk drive. Further, in a hard disk drive, when the amount of second and higher order run-out is corrected at each time immediately after the seeking, time delay occurs and hence reduces the seeking performance.

Typically, hard disk drives are used in a relatively stable environment such as the inside of a personal computer. Thus, the hard disk may perform the tracking reliably, by a retry operation even in the presence of an external shock. Recently, however, hard disk drives are often used in portable mobile devices and hence in mobile environments, subject to possible dynamic disturbance such as vibration and external shock, where the mobile devices may be carried by joggers and cars for example.

In a hard disk drive, a VCM (Voice Coil Motor) is used for a head drive mechanism, and its shaft is supported by means of a bearing. Thus, when, due to vibrations or a shock, the servo signal to the spindle motor breaks off or the swing arm swings irregularly, the head drive mechanism may go out of control. This causes a risk of failure of the head drive mechanism, such as a head crash due to overrun of the head.

Further, in redundant arrays of independent disks (RAID) mounted densely on a rack, disturbance vibrations tend to produce continuously due to mutual interference between a plurality of hard disk drives. This tends to cause their heads to frequently go off the tracks and hence undergo frequent retry operations. Thus, the operation time of the hard disk drives may become significantly long.

It is desirable to provide stable recording and reproduction of data onto and from a recording medium which may require precise tracking by using a simple head tracking mechanism.

Further, it is desirable to allow stable recording and reproduction of data onto and from a recording medium even under an environment where dynamic disturbances may continuously act on a write/read head for the recording medium.

The inventor has recognized that simple and precise track control may be achieved by first dividing data to be recorded on individual sectors of tracks of a DTM magnetic disk into a plurality of pieces of sector data for the respective individual sectors, and then storing them sequentially in a buffer memory at respective sequential locations, and by gradually moving the magnetic head in a radial direction of the disk and simultaneously writing each piece of buffered sector data into a corresponding sector on the track, independently of the order of the pieces of buffered sector data, whenever the magnetic head passes over such a corresponding sector on the track. In this approach, the order of the pieces of sector data to be written into the respective sectors on the tracks varies depending on a magnitude or amount of deviation of a trace trajectory or locus of the magnetic head from the tracks. Further, the inventor has recognized that reading of data on a DTM magnetic disk may be achieved similarly by gradually moving the magnetic head in a radial direction of the disk and simultaneously reading a piece of sector data from a sector on the track, independently of the order of the pieces of recorded sector data, whenever the magnetic head passes over the desired sector on the track, and by storing the pieces of read sector data sequentially into a buffer memory at respective corresponding locations in the order of being read by the magnetic head, so that a desired sequence of read data is reconstructed and recovered when the reading of the desired pieces of data of the sectors on the tracks has been completed.

The invention will be described in connection with embodiments with reference to the accompanying drawings. Throughout the drawings, similar symbols and numerals indicate similar items and functions.

FIG. 1 shows a hard disk drive (HDD) 200, which includes a DTM magnetic disk and a write and read control device for the magnetic disk, in accordance with an embodiment of the present invention.

The hard disk drive 200 is disposed inside or outside of an information processing device or a recording and reproducing device (not shown), and connected to such a device. The hard disk drive 200 includes: a DTM (discrete track medium) magnetic disk 100; a swing arm 120 having magnetic heads 122 and 124 for both of two front and back surface sides of the DTM magnetic disk 100, i.e. a side A and a side B, respectively; an actuator driver 250 for controlling the operation of the swing arm 120; and a spindle motor 150 for revolving the DTM magnetic disk 100. The hard disk drive 200 further includes: an interface (I/F) 202 with an internal bus of the information processing device; an input/output buffer memory (I/O BF) 204; a pair of groups of buffer memories 212 and 214, each group being composed of N sector data buffer memories (SEC DATA BF); and a pair of multiplexers 222 and 234 coupled to the respective groups of buffer memories 212 and 214. The hard disk drive 200 further includes: recording/reproducing circuits 242 and 244 for the respective sides A and B which are selectively switched and coupled to the multiplexers 222 and 234; and sector number identifying circuits 266 and 268 for the respective sides A and B for providing sector data selection signals to the multiplexers 222 and 234 so as to generate sector position signals. The hard disk drive 200 further includes: a seek control circuit 260 for providing a driving signal to the actuator driver 250 in accordance with a seek control signal from the input/output buffer memory 204 and with the sector position signals from the sector number identifying circuits 266 and 268; and a data transfer control circuit 270 for providing a transfer timing control signal to the input/output buffer memory 204 in accordance with the sector position signals from the sector number identifying circuits 266 and 268.

The number, N, of sectors of the data in the groups of buffer memories 212 and 214 is a value obtained by dividing one block of data (typically 32 K bytes) by the sector capacity (typically 0.5 K bytes), and is typically forty-six (64). The hard disk drive 200 may include a plurality of sets of similar DTM magnetic disks 100, 101, ..., and swing arms.

Wile either one of the recording/reproducing circuits 242 and 244 for the sides A and B is performing a read or write operation on one of the groups of buffer memories 212 and 214, the other recording/reproducing circuit can simultaneously perform another read or write operation on the other one of the groups of buffer memories 212 and 214.

Figure 2A:
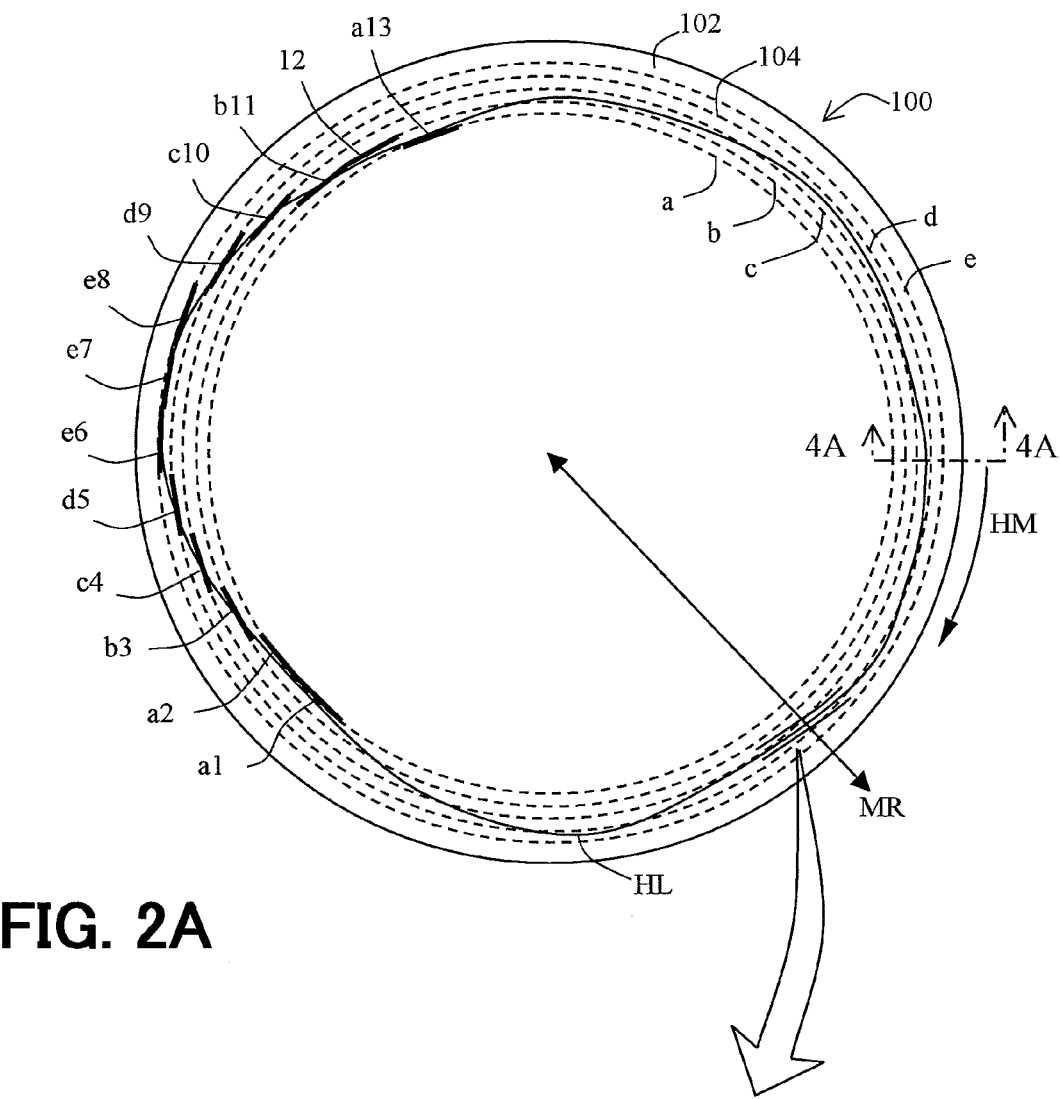
FIG. 2A shows an example of a particular closed-loop shaped trajectory of the magnetic head on the side A of the DTM magnetic disk.
Figure 2B:
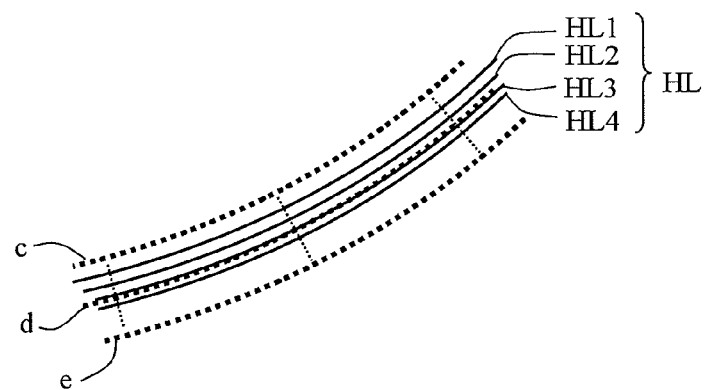
FIG. 2B is an enlarged partial view of the trajectories of the magnetic head.

FIG. 2A shows an example of a particular closed-loop shaped trace trajectory HL of the magnetic head 122 on the side A 102 of the DTM magnetic disk 100. In the figure, the spaces between tracks "a" to "e" and the shape distortion of the trajectory HL are enlarged for clarity. FIG. 2B is an enlarged partial view of the trajectories HL of the magnetic head 122.

Each of the tracks "a" to "e" is divided into a plurality of sectors. Typically, as a track is located at a more distant position from the center in a radial direction of the DTM magnetic disk 100, it has a larger number of sectors. Each sector includes a field of a sector number and a field of record data that follows the sector number field. The sector number may be added also to the beginning subfield of the field of record data.

The trajectory HL of the head 122 is corrected (with the sinusoidal waveform correction) only for the first-order run-out, which is a misalignment or deviation of the center point of the concentric circle tracks of the DTM magnetic disk 100, relative to the revolution axis. The trajectory HL of the magnetic head 122 may not be corrected or compensated for second-and-higher order shape distortions of the tracks on the DTM magnetic disk 100. In FIGS. 2A and 2B, for simplicity, the tracks "a" to "e" are represented by dashed line circles, while the trajectory HL is represented by a distorted circle.

While the DTM magnetic disk 100 is revolving, the seek control circuit 260 may perform radial position adjustment or correction on the magnetic head 122 only in accordance with the first-order correction, so that the magnetic head 122 makes one revolution around, i.e. rotates by 360 degrees, such that the trajectory HL forms a closed loop, which, however, actually involves the second-and-higher order track shape distortions. Thus, the magnetic head 122 sequentially passes over sectors a1, a2, b3, c4, d5, e6, e7, e8, d9, c10, b11, b12, a13, ... on the different adjacent tracks "a" to "e", and hence can perform the write or read operation on these tracks. In this case, in order to perform the write or read operation on all of the desired successive sectors on one or more adjacent tracks, the magnetic head 122 is controlled to move stepwise gradually in the radial direction such that the closed-loop shaped trajectories HL of the magnetic head 122 passes over all of these sectors. With employing such simple control only for the first-order correction, the recording/reproducing circuit 242 or 244 writes or reads sector data whenever the magnetic head 122 passes over the corresponding sectors, independently of the order of the track numbers. Thus, correction for the second-and-higher order track shape distortions is not required.

Figure 3:
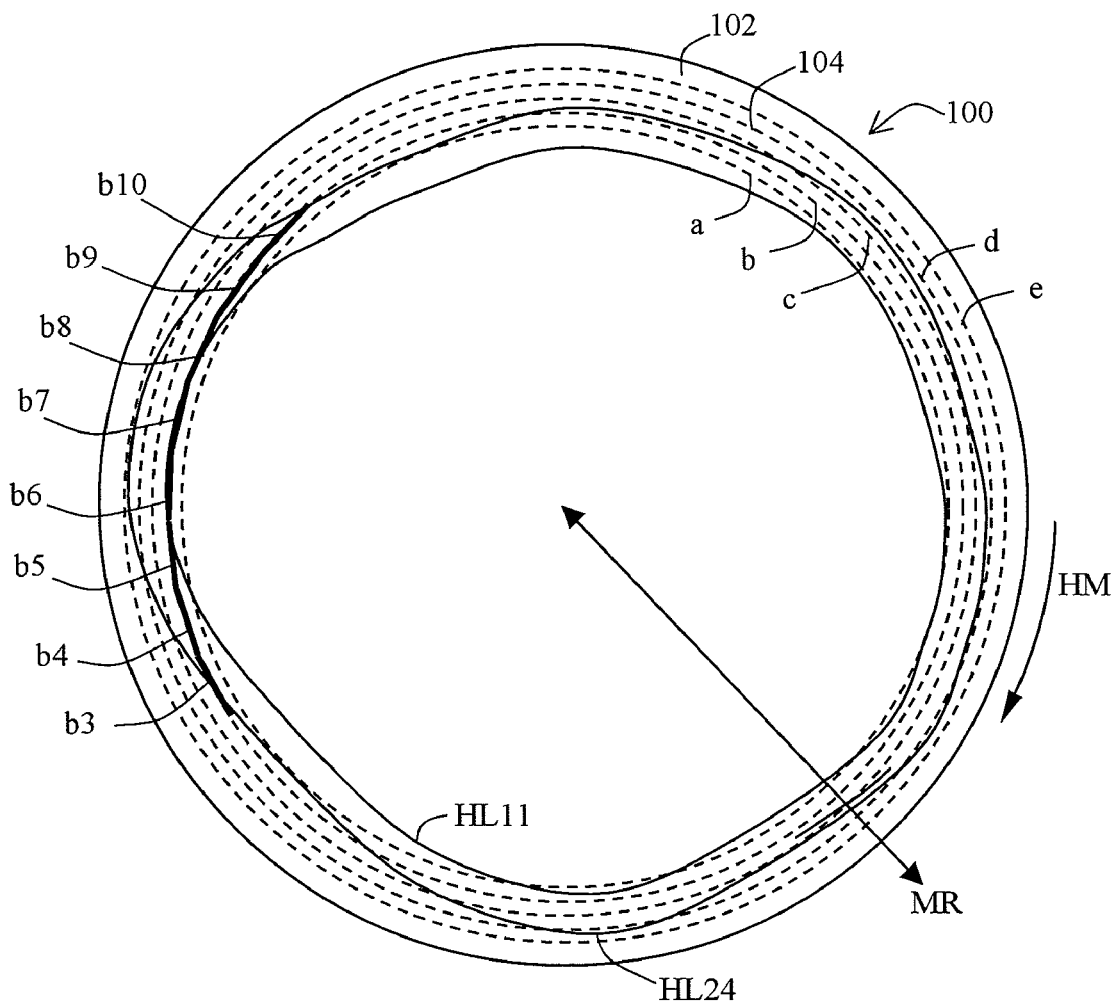
FIG. 3 shows an example of an innermost trajectory and an outermost trajectory, for performing a data write or read operation on the successive sectors of the track on the side A of the DTM magnetic disk.

FIG. 3 shows an example of an innermost trajectory HL11 and an outermost trajectory H24, for performing the data write or read operation on the successive sectors b3 to b10 of the track b on the side A 102 of the DTM magnetic disk 100.

Referring to FIG. 3, in order to perform the write or read operation on the successive sectors b3 to b10 of the track b on the side A 102 of the DTM magnetic disk 100, the magnetic head 122 can be moved in a radial direction MR gradually at steps or shift pitches, each step or pitch being shorter than the track pitch or interval, between the innermost closed-loop shaped trajectory HL11 and the outermost closed-loop shaped trajectory H24. During the radial motion, in order to perform a reliable data write or read operation on a particular sector of a particular track without magnetic interference between adjacent tracks, as shown in FIG. 2B, the magnetic head 122 can be moved gradually at steps of a predetermined distance in the radial direction, so that the magnetic head 122 forms a plurality of adjacent trajectories HL1, HL2, HL3 and HL4 located at equal step distances in the vicinity of the particular sector of the particular track, until the data of the particular sector has been written or read.

Figure 4:
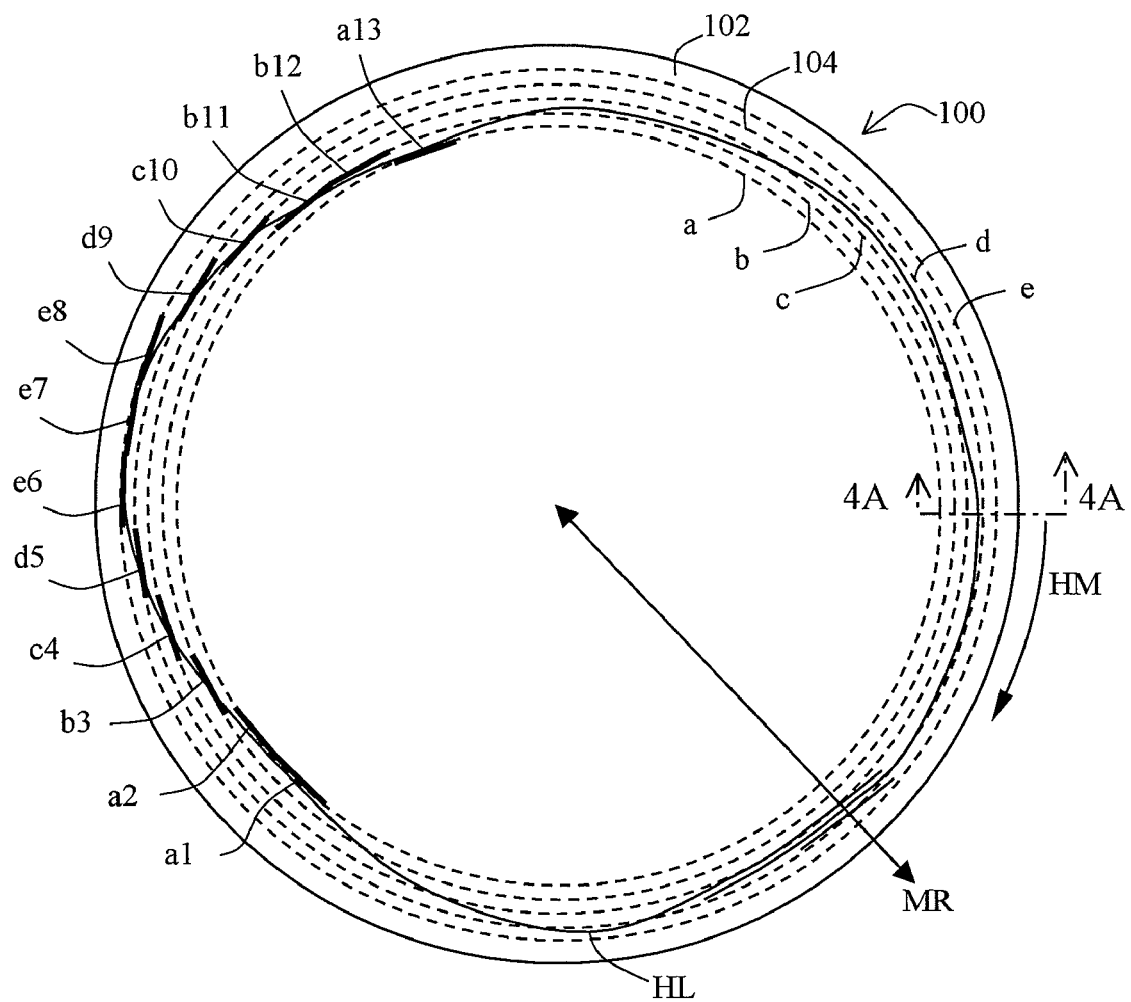
FIG. 4 shows an example of a spiral trajectory of the magnetic head on the side A of the DTM magnetic disk.

FIG. 4 shows an example of a spiral trajectory HL of the magnetic head 122 on the side A 102 of the DTM magnetic disk 100. In FIG. 2A, the magnetic head 122 is moved stepwise in the radial direction so that the closed loop is formed. In contrast, in FIG. 4, the magnetic head 122 is moved gradually and continuously in the radial direction such that the spiral trajectory HL is formed.

Figure 5A:
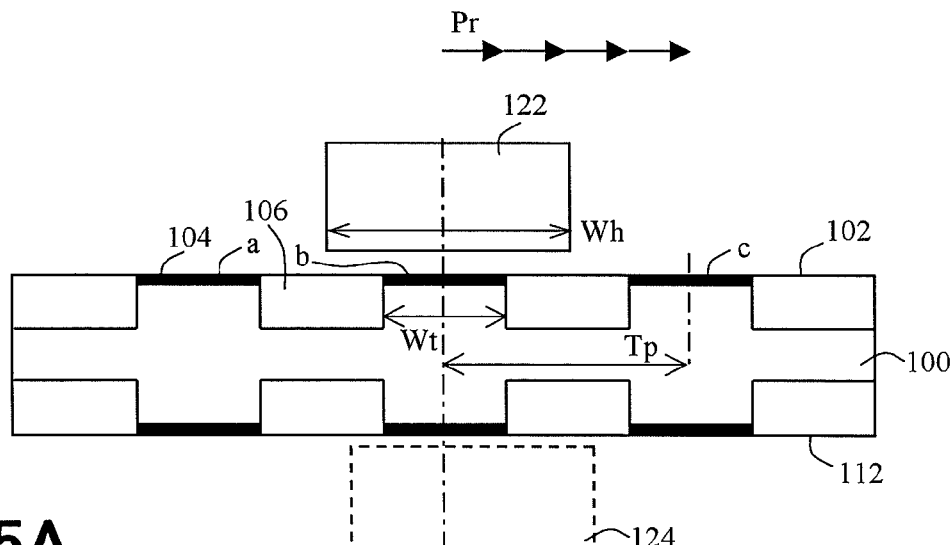
FIGS. 5A, 5B and 5C each show a schematic vertical sectional view of the DTM magnetic disk of FIG. 2A taken along a line 4A-4A, and the magnetic head located at a respective different position.
Figure 5B:
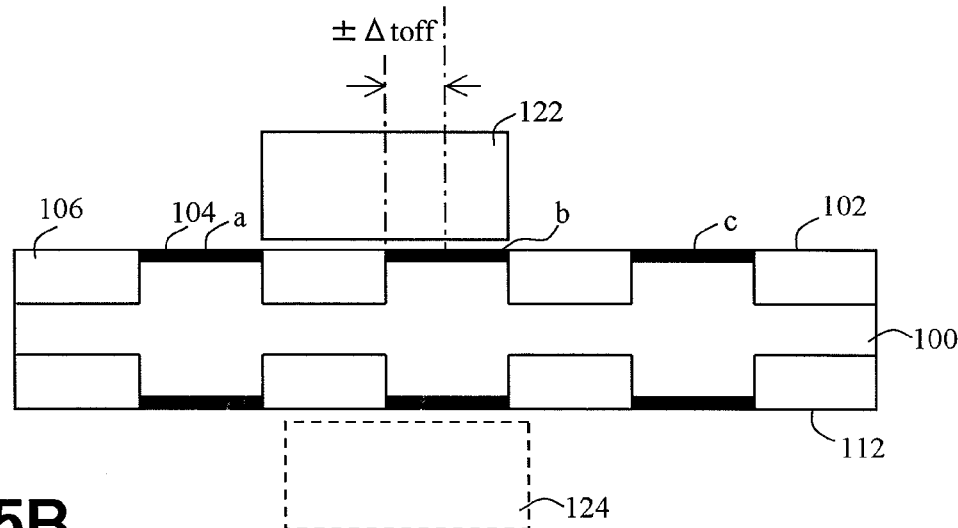
Figure 5C:
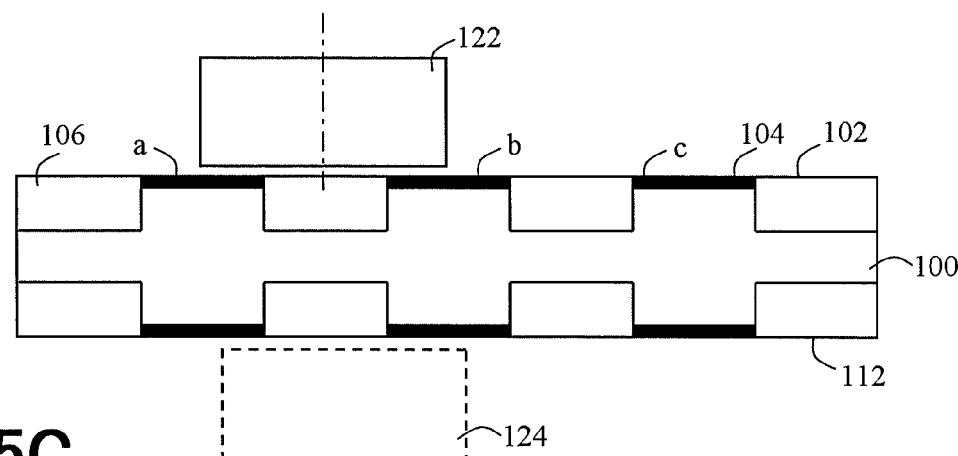

FIGS. 5A, 5B and 5C each show a schematic vertical sectional view of the DTM magnetic disk 100 of FIG. 2A taken along a line 4A-4A, and the magnetic head located at a respective different position. In the DTM magnetic disk 100, concentric circular grooves 106 are formed on the side A 102 and the side B 112 by dry etching or the like. Then, non-magnetic material (such as $SiO_2$) may be deposited and embedded in the grooves 106. A track magnetic recording film 104 is deposited on the top surface of concentric circular ribs, each having a width Wt, so that tracks "a" to "c" are formed. The side surfaces A and B 102 and 112 of the DTM magnetic disk 100 are flattened. The radial width Wh of each of the magnetic heads 122 and 124 is larger than the width Wt of the track magnetic recording film 104 and is equal to or smaller than the distance between adjacent track center lines or the pitch Tp (Wt<Wh≦Tp).

When each of the magnetic heads 122 and 124 covers one track completely as shown in FIGS. 5A and 5B, that magnetic head 122 or 124 can perform the write or read operation without cross-erase or cross-talk. Thus, when one edge of the magnetic head 122 of the width Wh is located within a range between distances Wt/2 and (Wh−Wt/2) in the radial direction relative to the center of the track (b), i.e., when the center of the magnetic head 122 is located within a range between distances −(Wh−Wt)/2 and +(Wh−Wt)/2 in the radial direction relative to the center of the track (b), the magnetic head can perform the data write or read operation normally. One trace pitch Pr for shifting the magnetic head 122 in the radial direction of the DTM magnetic disk 100 is typically (Tp−Wt)/2 and, for example, Tp/4 for Tp=2Wt.

On the other hand, when one edge of the magnetic head 122 is located within a range between distances (Tp−Wt/2) and (Wh+Wt/2) (≦Tp+Wt/2) in the radial direction relative to the center of the track (b), i.e., when the center of the magnetic head 122 is located within a range between distances (Tp−(Wt+Wh)/2) and (Wh+Wt)/2 in the radial direction relative to the center of the track (b), the magnetic head cannot normally perform the data write or read operation. When the magnetic head 122 is located to cover portions of both of the two adjacent tracks as shown in FIG. 5C, undesired cross-erase or cross-talk may occur, and hence the magnetic head cannot perform the data write or read operation.

Figure 6:
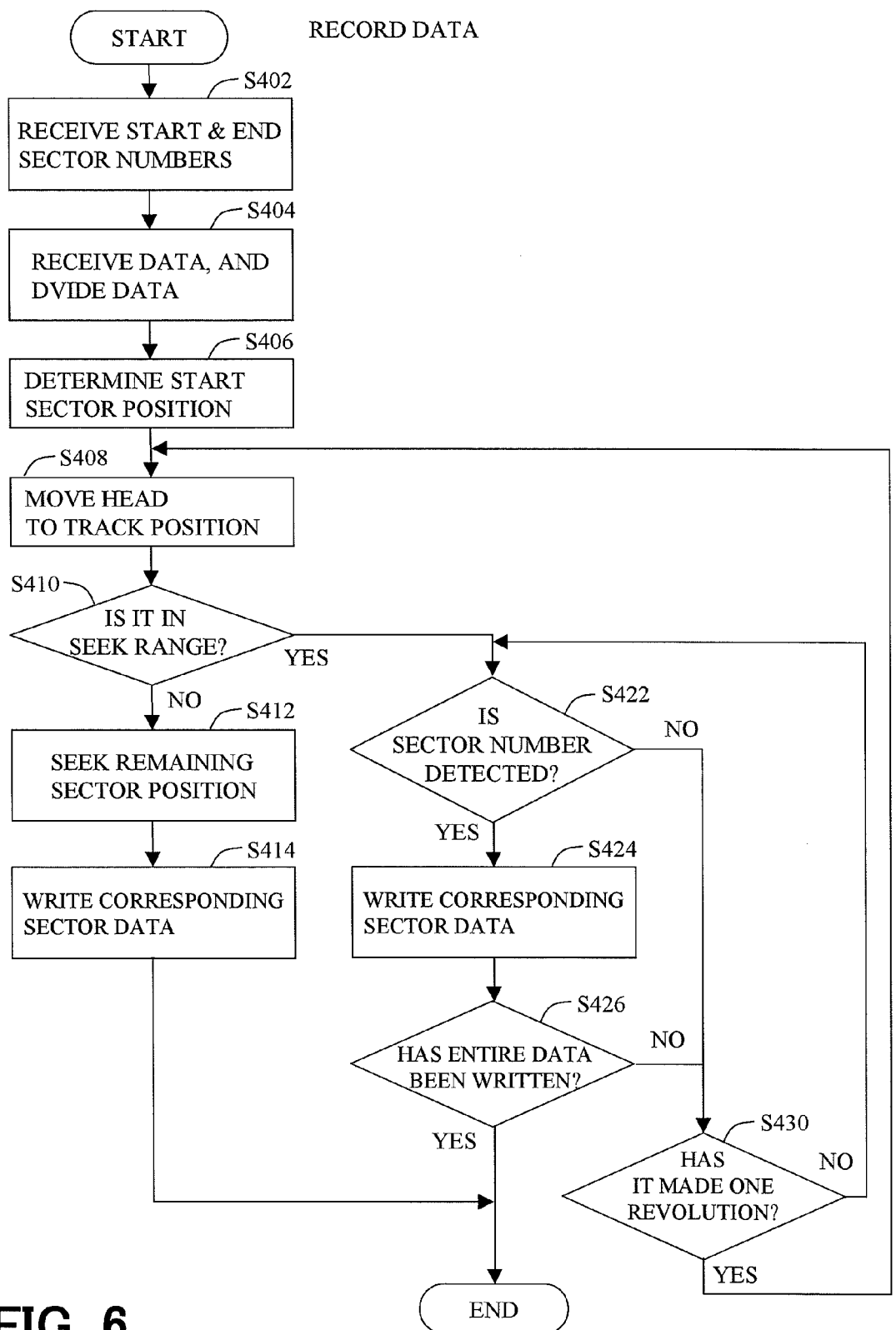
FIG. 6 is a flow chart for recording data onto the DTM magnetic disk, which is executed by the hard disk drive of FIG. 1.

FIG. 6 is a flow chart for recording data onto the DTM magnetic disk 100, which is executed by the hard disk drive 200 of FIG. 1.

At Step 402, the input/output buffer memory 204 receives the recording start sector number and the recording end sector number on the track or tracks of the DTM magnetic disk 100 from the information processing device or the recording/reproducing device via the interface 202, and then provides the start and end sector numbers to the seek control circuit 260.

At Step 404, the input/output buffer memory 204 further receives and stores data to be recorded, via the interface 202. Then, the input/output buffer memory 204 divides the received data into a plurality of pieces of sector data or packet data of a sector size, and then stores the data in order into the group of sector data buffer memories 212 or 214. The input/output buffer memory 204 may further add a sector number as a part of each sector data to the beginning subfield of each sector data.

At Step 406, in accordance with the start sector number, the seek control circuit 260 determines a position of a tracking start sector of the magnetic head 122 on the track of the corresponding one, for example, the side A, of the sides A and B of the DTM magnetic disk 100. Typically, the tracking start sector is a start sector number to be sought. Alternatively, the tracking start sector may be a sector number located at the innermost or the outermost position in the radial direction between the start sector number and the end sector number to be sought.

At Step 408, the seek control circuit 260 controls the actuator driver 250 to move the magnetic head 122 to a track position on the side A where the tracking start sector is located, and then receives a present sector position signal from the sector number identifying circuit 266 for the side A. For this purpose, the seek control circuit 260 may control the actuator driver 250 to move the magnetic head 122 backward to a track position by allowance distance (Tp−Wt)/2 or Tp−(Tp−Wt)/2 relative to the position of the tracking start sector, in the radial moving direction, to start seeking at.

At Step 410, the recording/reproducing circuit 242 determines whether the position or the trajectory HL of the magnetic head 122 is located within the seek range that covers the desired sector addresses where the data should be recorded, i.e., those addresses from the start sector number to the end sector number. If it is determined that it is not located within the seek range, the procedure goes to Step 412. If it is determined that it is located within the seek range, the seek control circuit 260 at Step 422 determines whether any desired sector number where data is not yet written has been detected. If it is determined that such a sector number is not detected, the procedure goes to Step 430.

If it is determined at Step 422 that any desired sector number has been detected, then the recording/reproducing circuit 242 at Step 424 retrieves a corresponding piece of data for the sector from the group of sector data buffer memories 212 or 214 via the multiplexer 222 or 234, and then writes the piece of data into that sector.

At Step 426, the recording/reproducing circuit 242 determines whether the entire data to be written has been written already. If it is determined that the entire data has been written, the procedure exits the routine of FIG. 6.

If it is determined at Step 426 that the write operation of the entire data is not yet completed, then the recording/reproducing circuit 242 at Step 430 determines whether the magnetic head 122 has made one revolution around along the track. If it is determined that the magnetic head 122 has not made one revolution around, the procedure returns to Step 422. If it is determined that the magnetic head 122 has made one revolution, the procedure returns to Step 408. At Step 408, the seek control circuit 260 controls the actuator driver 250 to move the magnetic head 122 to another track position on the side A in the predetermined radial direction by one pitch Pr, for example, outward by a trace pitch of the distance (Tp−Wt)/2, and then receives a present sector position signal from the sector number identifying circuit 266 for the side A.

If it is determined at Step 410 that the present sector position is not located within the seek range, then the seek control circuit 260 at Step 412 moves the magnetic head 122 to a remaining sector position which contains a sector number where data is not yet written, and then performs seeking. At Step 414, the recording/reproducing circuit 242 writes the remaining data into the corresponding sector. At Step 414, in order to write the remaining sector data not yet written, operations similar to those at Steps 422 to 430 may be performed.

Thus, the division of data to be recorded into sectors and the buffering of the sector data, as described above, simplify the control of the actuator driver 250 performed by the seek control circuit 260.

Thus, during the seeking operation by the seek control circuit 260, even when the hard disk drive 200 is subject to vibrations or a shock so that the magnetic head 122 suddenly jumps to non-sequential another sector position on the DTM magnetic disk 100, the seek control circuit 260 may attempt to control the actuator driver 250 to continue to sequentially move the magnetic head 122 from one track position to another on the side A in the predetermined radial direction by a pitch Pr, independently of the jump. The recording/reproducing circuit 242 continues to write the sector data into the corresponding sectors wherever possible. After that, when sector data not yet written remains in the group of buffer memories 212, the magnetic head 122 is moved to a sector position on the track corresponding to the remaining sector data. Then, the magnetic head 122 is moved from one track position to another gradually in the predetermined radial direction by the pitch Pr on the side A, while the recording/reproducing circuit 242 writes the sector data into the corresponding sectors. After that, this operation is repeated until the write of the entire desired record data is completed.

Figure 7:
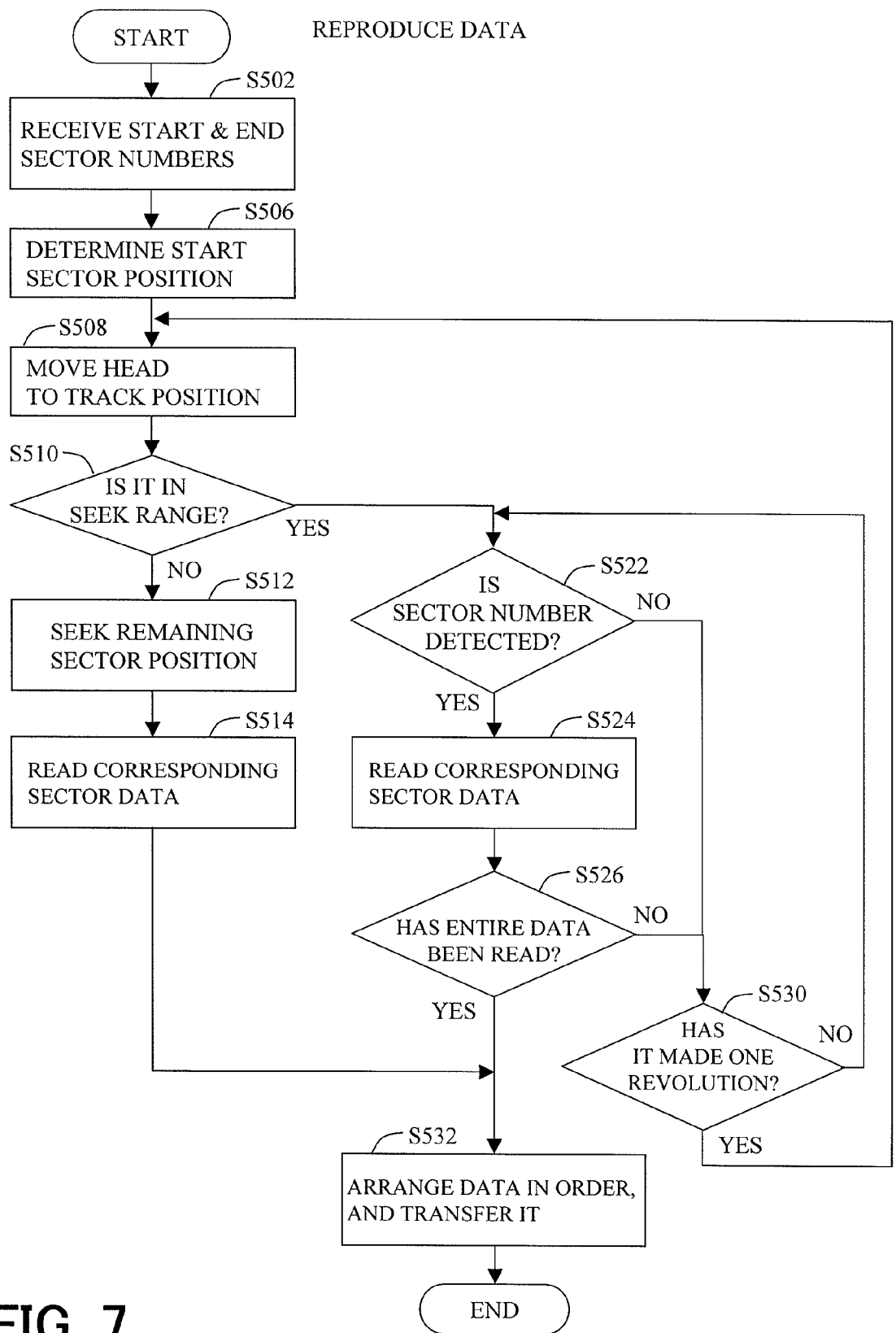
FIG. 7 is a flow chart for reproducing data retrieved from the DTM magnetic disk, which is executed by the hard disk drive of FIG. 1.

FIG. 7 is a flow chart for reproducing data retrieved from the DTM magnetic disk 100, which is executed by the hard disk drive 200 of FIG. 1.

At Step 502, the input/output buffer memory 204 receives the reproduction start sector number and the reproduction end sector number on the track of the DTM magnetic disk 100 from the information processing device or the recording/reproducing device via the interface 202, and then provides the start and end sector numbers to the seek control circuit 260.

Steps 506 and 508 are similar to Steps 406 and 408 of FIG. 6, and hence will not be described again.

Steps 510 and 522 are similar to Steps 410 and 422 of FIG. 6. In Step 510, the recording/reproducing circuit 242 determines whether the position or the trajectory HL of the magnetic head 122 is located within the seek range that covers the desired sector numbers where data is to be read.

If it is determined at Step 522 that any desired sector numbers have been detected, then the recording/reproducing circuit 242 at Step 524 reads the data from the corresponding sectors, and then stores the data via the multiplexer 222 into the sector data buffer memories at the corresponding addresses in the group of sector data buffer memories 212 or 214. In the case that the sector data read from the sector on the track has the sector number added within the sector data, the data may be written into the group of sector data buffer memories 212 in the order of having been read. In this case, while checking the sector numbers, the input/output buffer memory 204 reads data from the group of sector data buffer memories 212 in the order of the sector numbers, to thereby reproduce a sequence of data.

At Step 526, the recording/reproducing circuit 242 determines whether the entire data to be read has been read already. If it is determined that the entire data has been read, then the input/output buffer memory 204 at Step 532 reads the sequence of data from the group of sector data buffer memories 212 or 214, and then transfers the data to the external information processing device via the interface 202. After that, the procedure exits this routine.

If it is determined at Step 526 that the read of the entire data is not yet completed, then the recording/reproducing circuit 242 at Step 530 determines whether the magnetic head 122 has made one revolution around along the track. If it is determined that the magnetic head 122 has made one revolution around, the procedure returns to Step 508. If it is determined that the magnetic head 122 has not yet made one revolution around, the procedure returns to Step 522.

If it is determined at Step 510 that the present sector position is not located within the seek range, then the seek control circuit 260 at Step 512 moves the magnetic head 122 to a remaining sector position that contains a sector number where data is not yet read, and then performs seeking. At Step 514, the recording/reproducing circuit 242 reads the data from the corresponding sectors. At Step 514, in order to reproduce the remaining sector data not yet read, operations similar to those at Steps 522 to 530 may be performed.

Thus, the buffering of data to be reproduced as described above simplifies the control of the actuator driver 250 performed by the seek control circuit 260.

Thus, during the seeking by the seek control circuit 260, even if the hard disk drive 200 is subject to vibrations or a shock so that the magnetic head 122 suddenly jumps to non-sequential another sector position on the side A of the DTM magnetic disk 100, the seek control circuit 260 may attempt to control the actuator driver 250 to continue to sequentially move the magnetic head 122 from one track position to another on the side A in the predetermined radial direction by the pitch Pr, independently of the jump. The recording/reproducing circuit 242 attempts to continue to read the sector data from the corresponding sectors wherever possible. After that, when one or more desired sectors not yet read remain on the side A, the magnetic head 122 is moved to a corresponding sector position on the track. Then, the magnetic head 122 is moved from one track position to another gradually in a predetermined radial direction by the pitch Pr on the side A, while the recording/reproducing circuit 242 reads the data from the corresponding sectors. After that, this operation is repeated until the read of the desired reproduction data is completed.

The control and the processing for the recording of FIG. 6 and the reproduction of FIG. 7 are similarly applicable to the side B of the DTM magnetic disk 100.

The magnetic head 122 for side A and the magnetic head 124 for side B are fixed to the swing arm 120, and hence cannot be moved independently. However, while the magnetic head 122 for the side A is seeking a range of a plurality of sectors distributed in a plurality of tracks on the side A of the DTM magnetic disk 100 for the purpose of a preceding, preferential or prioritized write or read operation of a particular sequence of data on the side A (Steps 408 to 430 of FIG. 6 or Steps 508 to 530 of FIG. 7), the recording/reproducing circuit 244 may simultaneously perform write or read of data on the side B of the DTM magnetic disk 100 (Steps 410 to 430 of FIG. 6 or Steps 510 to 530 of FIG. 7) when the magnetic head 124 for side B is located within a desired seek range on the side B of the DTM magnetic disk 100. After the completion of the seek on the side A of the DTM magnetic disk 100, Steps 412 to 414 of FIG. 6 or Steps 512 to 514 of FIG. 7 may be further executed for the side B when there is a remaining sector on the side B.

Similarly, while the magnetic head 122 or 124 for the side A or B is seeking a range of a plurality of sectors distributed in a plurality of tracks on the side A or B of the DTM magnetic disk 100 for the purpose of a recording or read operation of a sequence of data, the recording/reproducing circuit 244 may simultaneously write or read another sequence of data on the side A or B of another DTM magnetic disk 101 when a third magnetic head is located within a desired seek range on the side A or B of the other DTM magnetic disk 101. After the completion of the seek on the side A or B of the DTM magnetic disk 100, Steps 412 to 414 of FIG. 6 or Steps 512 to 514 of FIG. 7 may be further executed for the other DTM magnetic disk 101 when there is a remaining sector on the side A or B of the other DTM magnetic disk 101.

In comparison with the conventional technique with one revolution for one track pitch shift, the seeking technique in the present embodiment, requires two or more revolutions for one track pitch shift, and hence the effective data transfer rate may be reduced for recording and reproduction. However, while the hard disk drive 200 is subject to continuous vibrations or shocks, this may not involve frequent retry operations and an out-of-control condition. Thus, recording and reproduction of data can be performed reliably. Accordingly, this technique is remarkably effective in a mobile environment where continuous data transfer or streaming is required for video or music reproduction, and the like.

According to the embodiment described above, the hard disk drive 200, even under an environment where dynamic disturbance such as vibrations and shocks can continuously act on the hard disk drive, data can be recorded and reproduced stably onto and from the recording medium. The servo mechanism of the hard disk drive may be required to follow or accommodate a first-order run-out frequency component, may not be required to have high-performance, and may have lower power consumption. Further, this system is tolerant to an off-track condition caused by dynamic disturbance such as continuously acting vibrations, which may cause a problem in a hard disk drive carried by a vehicle and in an integrated arrangement of a plurality of hard disk drives such as a RAID arrangement.

According to the embodiments described above, the hard disk drive 200 may provide a hard disk drive mechanism that can perform reliable recording and reproduction of data, even when the actuator for driving the magnetic head merely operates in stepwise or intermittent motion in a radial direction of the recording medium, which may occur in a stepping motor drive.

According to the embodiments described above, the hard disk drive 200 may provide simultaneous write and/or read of data on the two sides of each disk, or on the different recording surfaces of a large number of disks, even when there are variations in position between the magnetic heads and the respective disk surfaces of the disks, which may result in an approximately twice or higher data transfer rate.

The above-described embodiments are only typical examples, and their combination, modifications and variations are apparent to those skilled in the art. It should be noted that those skilled in the art can make various modifications to the above-described embodiments without departing from the principle of the invention and the accompanying claims.

What is claimed is:

1. A hard disk drive comprising:
   a discrete track medium (DTM) magnetic disk which has a plurality of tracks, each track being divided into a plurality of sectors;
   a write/read head which writes sector data onto one side of said DTM magnetic disk, and which reads sector data from the one side of said DTM magnetic disk;
   a sector data buffer memory unit;
   a recording/reproducing unit which provides sector data from said sector data buffer memory unit, to said write/read head, and which provides sector data from said write/read head, to said sector data buffer memory unit; and
   a seek control unit which controls said write/read head in terms of position, in accordance with a sector number of a sector where a piece of sector data is to be written or read and with a sector number of a sector where said write/read head is located, wherein
   the piece of sector data to be written or read is pre-associated with the sector number of the sector where the piece of sector data is to be written or read,
   said seek control unit corrects first-order run-out relative to a revolution axis of said DTM magnetic disk and permits second-and-higher order run-out relative to the revolution axis of said DTM magnetic disk, and moves said write/read head gradually in a radial direction of said DTM magnetic disk at a shift pitch smaller than the track pitch for each revolution in accordance with sector numbers of sectors where pieces of sector data are to be written or read, within a range of tracks containing the sector numbers of the sectors where the pieces of sector data are to be written or read, and
   said recording/reproducing unit writes or reads, in accordance with a present sector number of a sector where said write/read head is located, a corresponding piece of sector data onto or from said DTM magnetic disk, independently of the order of the sector numbers.

2. The hard disk drive according to claim 1, wherein independently of the order of the pieces of sector data to be written, when said write/read head moves to a sector at a present position on said DTM magnetic disk corresponding to any one of the pieces of sector data to be written, said recording/reproducing unit provides to said write/read head the one piece of sector data from said sector data buffer memory unit, to thereby write the one piece of sector data into the corresponding sector on said DTM magnetic disk, and wherein
independently of the order of the pieces of sector data to be read, when said write/read head moves to any one of the sectors at a present position to be read on said DTM magnetic disk, said recording/reproducing unit provides one piece of sector data from the one sector read by said write/read head, to said sector data buffer memory unit, and thereby reads the one piece of sector data from said DTM magnetic disk.

3. The hard disk drive according to claim 2, wherein the movement of said write/read head on said DTM magnetic disk controlled by said seek control unit is a stepping movement which forms closed-loop trajectories or a continuous movement which forms a spiral trajectory.

4. The hard disk drive according to claim 3, wherein the movement in a radial direction of said DTM magnetic disk of said write/read head controlled by said seek control unit represents a radial distance of $(Tp-Wt)/2$ per one revolution of said DTM magnetic disk, for a radial distance Tp between centers of adjacent ones of the tracks and a radial width Wt of a magnetic recording film of each track.

5. The hard disk drive according to claim 2, wherein the movement in a radial direction of said DTM magnetic disk of said write/read head controlled by said seek control unit represents a radial distance of $(Tp-Wt)/2$ per one revolution of said DTM magnetic disk, for a radial distance Tp between centers of adjacent ones of the tracks and a radial width Wt of a magnetic recording film of each track.

6. The hard disk drive according to claim 2, wherein after said write/read head has moved gradually in a radial direction of said DTM magnetic disk in the range of tracks, if there is a remaining one of the pieces of sector data to be written or read that is not yet written onto or read from said DTM magnetic disk, said seek control unit moves said write/read head gradually in a radial direction of said DTM magnetic disk in a range of tracks which contains a corresponding sector at a sector number thereof where the remaining piece of data is to be written or read.

7. The hard disk drive according to claim 2, wherein a piece of record data which has been written into a corresponding sector on said DTM magnetic disk contains a sector number of the corresponding sector.

8. The hard disk drive according to claim 1, wherein the movement of said write/read head on said DTM magnetic disk controlled by said seek control unit is a stepping movement which forms closed-loop trajectories or a continuous movement which forms a spiral trajectory.

9. The hard disk drive according to claim 8, wherein after said write/read head has moved gradually in a radial direction of said DTM magnetic disk in the range of tracks, if there is a remaining one of the pieces of sector data to be written or read that is not yet written onto or read from said DTM magnetic disk, said seek control unit moves said write/read head gradually in a radial direction of said DTM magnetic disk in a range of tracks which contains a corresponding sector at a sector number thereof where the remaining piece of data is to be written or read.

10. The hard disk drive according to claim 8, wherein a piece of record data which has been written into a corresponding sector on said DTM magnetic disk contains a sector number of the corresponding sector.

11. The hard disk drive according to claim 1, wherein the movement in a radial direction of said DTM magnetic disk of said write/read head controlled by said seek control unit represents a radial distance of $(Tp-Wt)/2$ per one revolution of said DTM magnetic disk, for a radial distance Tp between centers of adjacent ones of the tracks and a radial width Wt of a magnetic recording film of each track.

12. The hard disk drive according to claim 11, wherein after said write/read head has moved gradually in a radial direction of said DTM magnetic disk in the range of tracks, if there is a remaining one of the pieces of sector data to be written or read that is not yet written onto or read from said DTM magnetic disk, said seek control unit moves said write/read head gradually in a radial direction of said DTM magnetic disk in a range of tracks which contains a corresponding sector at a sector number thereof where the remaining piece of data is to be written or read.

13. The hard disk drive according to claim 11, wherein a piece of record data which has been written into a corresponding sector on said DTM magnetic disk contains a sector number of the corresponding sector.

14. The hard disk drive according to claim 1, wherein after said write/read head has moved gradually in a radial direction of said DTM magnetic disk in the range of tracks, if there is a remaining one of the pieces of sector data to be written or read that is not yet written onto or read from said DTM magnetic disk, said seek control unit moves said write/read head gradually in a radial direction of said DTM magnetic disk in a range of tracks which contains a corresponding sector at a sector number thereof where the remaining piece of data is to be written or read.

15. The hard disk drive according to claim 1, wherein a piece of record data which has been written into a corresponding sector on said DTM magnetic disk contains a sector number of the corresponding sector.

16. A hard disk drive comprising:
   at least one DTM magnetic disk, each of which has a plurality of tracks on each of two sides of that DTM magnetic disk, each track being divided into a plurality of sectors;
   a first write/read head which writes sector data onto a first one of sides of said at least one DTM magnetic disk, and which reads sector data from the first side of said at least one DTM magnetic disk;
   a second write/read head ganged with said first write/read head, which second write/read head writes sector data onto a second one of the sides of said at least one DTM magnetic disk, and which second write/read head reads sector data from the second side of said at least one DTM magnetic disk;
   first and second sector data buffer memory units;
   a first recording/reproducing unit which provides, to said first write/read head, sector data from one of said first and second sector data buffer memory units, and which provides, to said one of said first and second sector data buffer memory units, sector data from said first write/read head;
   a second recording/reproducing unit which provides, to said second write/read head, sector data from the other of said first and second sector data buffer memory units, and which provides, to the other of said first and second sector data buffer memory units, sector data from said second write/read head; and
   a seek control unit which controls one of said first and second write/read heads in terms of position, in accordance with a sector number of a sector where a piece of sector data is to be written or read and with a sector number where the one of said first and second write/read heads is located, wherein
   a first sequence of pieces of sector data to be written or read is pre-associated with sector numbers of sectors where the first sequence of data is to be written or read, and
   a second sequence of pieces of sector data to be written or read is pre-associated with sector numbers of sectors where the second sequence of data is to be written or read, wherein said seek control unit corrects first-order run-out relative to a revolution axis of the first side of said at least one DTM magnetic disk and permits second-and-higher order run-out relative to the revolution axis of the first side of said at least one DTM magnetic disk, and moves said first write/read head gradually in a radial direction of said DTM magnetic disk at a shift pitch smaller than the track pitch for one revolution in accordance with sector numbers of a first series of sectors where the first series of sectors are to be written or read, within a range of tracks containing the sector numbers of the first series of sectors where the first sequence of pieces of sector data is written or read, and said recording/reproducing unit writes or reads, in accordance with a present sector number of a sector on the first side of said least one DTM magnetic disk where said first write/read head is located, a corresponding piece of sector data onto or from the first side independently of the order of the sector numbers, and simultaneously writes or reads, in accordance with a present sector number of a sector on the second side of said at least one DTM magnetic disk where said second write/read head is located, a corresponding piece of sector data onto or from the second side, independently of the order of the sector numbers.

17. An information processing device comprising a hard disk drive, which comprises:
   a DTM magnetic disk which has a plurality of tracks, each track being divided into a plurality of sectors;
   a write/read head which writes sector data onto one side of said DTM magnetic disk, and which reads sector data from the one side of said DTM magnetic disk;
   a sector data buffer memory unit;
   a recording/reproducing unit which provides sector data from said sector data buffer memory unit, to said write/read head, and which provides sector data from said write/read head, to said sector data buffer memory unit; and
   a seek control unit which controls said write/read head in terms of position, in accordance with a sector number of a sector where a piece of sector data is to be written or read and with a sector number of a sector where said write/read head is located, wherein
   the piece of sector data to be written or read is pre-associated with the sector number of the sector where the piece of sector data is to be written or read,
   said seek control unit corrects first-order run-out relative to a revolution axis of said DTM magnetic disk and permits second-and-higher order run-out relative to the revolution axis of said DTM magnetic disk, and moves said write/read head gradually in a radial direction of said DTM magnetic disk at a shift pitch smaller than the track pitch for each revolution in accordance with sector numbers of sectors where pieces of sector data are to be written or read, within a range of tracks containing the sector numbers of the sectors where the pieces of sector data are to be written or read, and
   said recording/reproducing unit writes or reads, in accordance with a present sector number of a sector where said write/read head is located, a corresponding piece of sector data onto or from said DTM magnetic disk, independently of the order of the sector numbers.

* * * * *